United States Patent
Yu

(10) Patent No.: US 11,014,499 B2
(45) Date of Patent: May 25, 2021

(54) BACK VIEW MIRROR DEVICE FOR VEHICLE, AUTOMATICALLY ADJUSTABLE BACK VIEW MIRROR APPARATUS FOR VEHICLE AND METHOD FOR AUTOMATICALLY ADJUSTING POSITION OF BACK VIEW MIRROR FOR VEHICLE

(71) Applicant: BOE Technology Group Co., Ltd., Beijing (CN)

(72) Inventor: Zhanquan Yu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 267 days.

(21) Appl. No.: 16/123,934

(22) Filed: Sep. 6, 2018

(65) Prior Publication Data

US 2019/0299863 A1    Oct. 3, 2019

(30) Foreign Application Priority Data

Mar. 28, 2018  (CN) .......................... 201810264912.8

(51) Int. Cl.
    *B60R 1/02*    (2006.01)
    *B60R 1/04*    (2006.01)
    (Continued)

(52) U.S. Cl.
    CPC ................ *B60R 1/025* (2013.01); *B60R 1/04* (2013.01); *B60R 11/00* (2013.01); *B60R 11/04* (2013.01);
    (Continued)

(58) Field of Classification Search
    CPC ........... B60R 1/025; B60R 1/04; B60R 11/00; B60R 11/04; B60R 2011/0033;
    (Continued)

(56) References Cited

U.S. PATENT DOCUMENTS

| | | | |
|---|---|---|---|
| 2005/0046978 A1* | 3/2005 | Schofield | .................. B60R 1/04 359/876 |
| 2010/0177413 A1* | 7/2010 | Lee | .......................... B60R 1/072 359/843 |
| 2014/0119567 A1* | 5/2014 | DeLine | .................. G07F 7/1008 381/86 |

FOREIGN PATENT DOCUMENTS

| CN | 1032525 A | 4/1989 |
|---|---|---|
| CN | 2723278 Y | 9/2005 |

(Continued)

OTHER PUBLICATIONS

Li, CN109552175A, English Translation (Year: 2017).*

(Continued)

*Primary Examiner* — Hunter B Lonsberry
*Assistant Examiner* — Elizabeth Yang
(74) *Attorney, Agent, or Firm* — McDermott Will & Emery LLP

(57) ABSTRACT

A back view mirror device for a vehicle, an automatically adjustable back view mirror apparatus for a vehicle and a method for automatically adjusting position of a back view mirror for a vehicle are provided. The back view mirror device includes: a back view mirror body; a translation actuating device configured to drive the back view mirror body to translate and position the back view mirror body in a translating direction; and a rotating actuating device configured to drive the back view mirror body to rotate and position the back view mirror body in a rotating direction.

18 Claims, 9 Drawing Sheets

(51) Int. Cl.
  *B60R 11/00* (2006.01)
  *B60R 11/04* (2006.01)
  *G06K 9/00* (2006.01)
  *G10L 15/22* (2006.01)
(52) U.S. Cl.
  CPC .. *B60R 2011/0033* (2013.01); *G06K 9/00255* (2013.01); *G06K 9/00838* (2013.01); *G10L 15/22* (2013.01); *G10L 2015/223* (2013.01)
(58) Field of Classification Search
  CPC ............ G06K 9/00255; G06K 9/00838; G10L 15/22; G10L 2015/223
  See application file for complete search history.

(56) References Cited

FOREIGN PATENT DOCUMENTS

| | | | |
|---|---|---|---|
| CN | 101301873 | A | 11/2008 |
| CN | 201646557 | U | 11/2010 |
| CN | 103568960 | A | 2/2014 |
| CN | 103754165 | A | 4/2014 |
| CN | 203713705 | U * | 7/2014 |
| CN | 203713705 | U | 7/2014 |
| CN | 105083128 | A | 11/2015 |
| CN | 106274700 | A | 1/2017 |
| CN | 106711074 | A | 5/2017 |
| CN | 206644735 | U | 11/2017 |
| CN | 109552175 | A * | 4/2019 |
| EP | 0312232 | A1 | 4/1989 |

OTHER PUBLICATIONS

Zhang, CN109552175A, English Translation (Year: 2013).*
Office Action issued in corresponding Chinese Patent Application No. 201810264912.8, dated Jun. 24, 2019.
Office Action issued in corresponding Chinese Patent Application No. 201810264912.8, dated May 26, 2020.

\* cited by examiner

BACK VIEW MIRROR DEVICE FOR VEHICLE, AUTOMATICALLY ADJUSTABLE BACK VIEW MIRROR APPARATUS FOR VEHICLE AND METHOD FOR AUTOMATICALLY ADJUSTING POSITION OF BACK VIEW MIRROR FOR VEHICLE

CROSS-REFERENCE TO RELATED APPLICATION

This application claims the priority benefit of Chinese Patent Application No. 201810264912.8 filed on Mar. 28, 2018 in the State Intellectual Property Office of China, the disclosure of which is incorporated herein by reference in entirety.

BACKGROUND

Technical Field

The present disclosure relates to the field of intelligent control technology, and in particular, to a back view mirror device for a vehicle, an automatically adjustable back view mirror apparatus for a vehicle and a method for automatically adjusting position of a back view mirror for a vehicle.

Description of the Related Art

In the related art, a back view mirror for a vehicle has fixed position. A vehicle driver may adjust an inclination angle of the back view mirror manually. However, the position of the back view mirror cannot be adjusted to limit scene of application; further, the back view mirror cannot be controlled intelligently and thus efficiency of voice interaction is low.

SUMMARY

An embodiment of the present disclosure provides a back view mirror device for a vehicle, the back view mirror device comprising: a back view mirror body; a translation actuating device configured to drive the back view mirror body to translate and position the back view mirror body in a translating direction; and a rotating actuating device configured to drive the back view mirror body to rotate and position the back view mirror body in a rotating direction.

In some embodiments, the translation actuating device comprises: a first linear moving device configured to drive the back view mirror body to translate in a first direction; and a second linear moving device configured to drive the back view mirror body to translate in a second direction perpendicular to the first direction.

In some embodiments, the rotation actuating device comprises: a first rotating device configured to drive the back view mirror body to rotate about a first axis perpendicular to the first direction and the second direction; and a second rotating device configured to drive the back view mirror body to rotate about a second axis parallel to the first direction.

In some embodiments, the translation actuating device comprises: a housing; a base and a first driver accommodated in the housing; a lead screw connected to the first driver through an end of the base; a first guide track connected between two ends of the base; a slider connector, the first driver driving the lead screw to rotate to move the slider connector on the first guide track in a first direction; a second driver on the slider connector; and a second guide track connected onto the second driver, the second driver driving the second guide track to move in a second direction perpendicular to the first direction.

In some embodiments, the rotation actuating device comprises: a first rotation axle connector connected to an end of the second guide track; a third driver connected to the first rotation axle connector, the first rotation axle connector rotating about a first axis with driven by the third driver; a second rotation axle connector connected pivotably to the first rotation axle connector; and a fourth driver connected to the second rotation axle connector, the second rotation axle connector rotating about a second axis with driven by the fourth driver; wherein the back view mirror body is mounted on the second rotation axle connector, and wherein one of the first axis and the second axis is perpendicular to both the first direction and the second direction, and the other of the first axis and the second axis is parallel to the first direction.

In some embodiments, the first driver and the second driver each comprise one of an electric cylinder, a gas cylinder or a hydraulic cylinder.

In some embodiments, the third driver and the fourth driver each comprise one of a rotation motor, a hydraulic rotation driver or a pneumatic rotation driver.

An embodiment of the present disclosure also provides an automatically adjustable back view mirror apparatus for a vehicle, the automatically adjustable back view mirror apparatus comprising: the back view mirror device as described above; an image collector configured to collect a face image information of a vehicle driver; and a processor configured to determine translation adjustment amounts and rotation adjustment amounts of the back view mirror body, on a basis of the face image information, and to produce a first adjusting signal with the translation adjustment amounts and a second adjusting signal with the rotation adjustment amounts, wherein the translation actuating device is configured to translate the back view mirror body by the translation adjustment amounts in response to the first adjusting signal and the rotation actuating device is configured to rotate the back view mirror body by the rotation adjustment amounts in response to the second adjusting signal.

In some embodiments, the translation adjustment amounts comprise a first translation adjustment amount and a second translation adjustment amount, and the translation actuating device comprises: a first linear moving device configured to drive the back view mirror body to translate in a first direction by the first translation adjustment amount in response to the first adjusting signal; and a second linear moving device configured to drive the back view mirror body to translate in a second direction perpendicular to the first direction by the second translation adjustment amount in response to the first adjusting signal.

In some embodiments, the rotation adjustment amounts comprise a first rotation adjustment amount and a second rotation adjustment amount, and the rotation actuating device comprises: a first rotating device configured to drive the back view mirror body to rotate about a first axis perpendicular to the first direction and the second direction by the first rotation adjustment amount in response to the second adjusting signal; and a second rotating device configured to drive the back view mirror body to rotate about a second axis parallel to the first direction by the second rotation adjustment amount in response to the second adjusting signal.

In some embodiments, the face image information of the vehicle driver at least comprises eye position image information.

In some embodiments, the image collector comprises a binocular camera.

In some embodiments, the automatically adjustable back view mirror apparatus further comprises: a voice receiver configured to receive voice instructions from the vehicle driver and to send the voice instructions to the processor, wherein the processor is also configured to regulate the translation adjustment amounts and the rotation adjustment amounts in response to the voice instructions.

In some embodiments, the automatically adjustable back view mirror apparatus further comprises: a position feedback device configured to feed back position of the back view mirror body to the processor in real-time.

An embodiment of the present disclosure also provides a method for automatically adjusting position of a back view mirror for a vehicle, the method comprising: collecting face image information of a vehicle driver; determining translation adjustment amounts and rotation adjustment amounts of a back view mirror body by a processor on a basis of the image information and producing a first adjusting signal with the translation adjustment amounts and a second adjusting signal with the rotation adjustment amounts; and driving the back view mirror body to translate by the translation adjustment amounts in response to the first adjusting signal and driving the back view mirror body to rotate by the rotation adjustment amounts in response to the second adjusting signal.

In some embodiments, the translation adjustment amounts comprise a first translation adjustment amount and a second translation adjustment amount, and the rotation adjustment amounts comprise a first rotation adjustment amount and a second rotation adjustment amount, and wherein the driving the back view mirror body to translate by the translation adjustment amounts in response to the first adjusting signal and driving the back view mirror body to rotate by the rotation adjustment amounts in response to the second adjusting signal comprises at least one of following steps: driving the back view mirror body to translate in a first direction by the first translation adjustment amount in response to the first adjusting signal; driving the back view mirror body to translate in a second direction perpendicular to the first direction by the second translation adjustment amount in response to the first adjusting signal; driving the back view mirror body to rotate about a first axis perpendicular to the first direction and the second direction by the first rotation adjustment amount in response to the second adjusting signal; and driving the back view mirror body to rotate about a second axis parallel to the first direction by the second rotation adjustment amount in response to the second adjusting signal.

In some embodiments, the determining translation adjustment amounts and rotation adjustment amounts of a back view mirror body by a processor on a basis of the image information comprises: feeding back position of the back view mirror body to the processor in real-time and determining the translation adjustment amounts and the rotation adjustment amounts by the processor depending on the image information and the fed back position of the back view mirror body.

In some embodiments, the method further comprises: collecting updated face image information of the vehicle driver in real-time; determining whether the position of face of the vehicle driver changes in the updated face image information, by the processor, and updating the translation adjustment amounts and the rotation adjustment amounts of the back view mirror body; and driving the back view mirror body to translate by the updated translation adjustment amounts and driving the back view mirror body to rotate by the updated rotation adjustment amounts.

In some embodiments, the face image information of the vehicle driver at least comprises eye position image information.

In some embodiments, the method further comprises: regulating the translation adjustment amounts and the rotation adjustment amounts of the back view mirror body depending on voice instructions of the vehicle driver.

BRIEF DESCRIPTION OF THE DRAWINGS

The embodiments of the present disclosure will be described below in details with reference to the following figures.

DETAILED DESCRIPTION OF EMBODIMENTS

Figure 1:
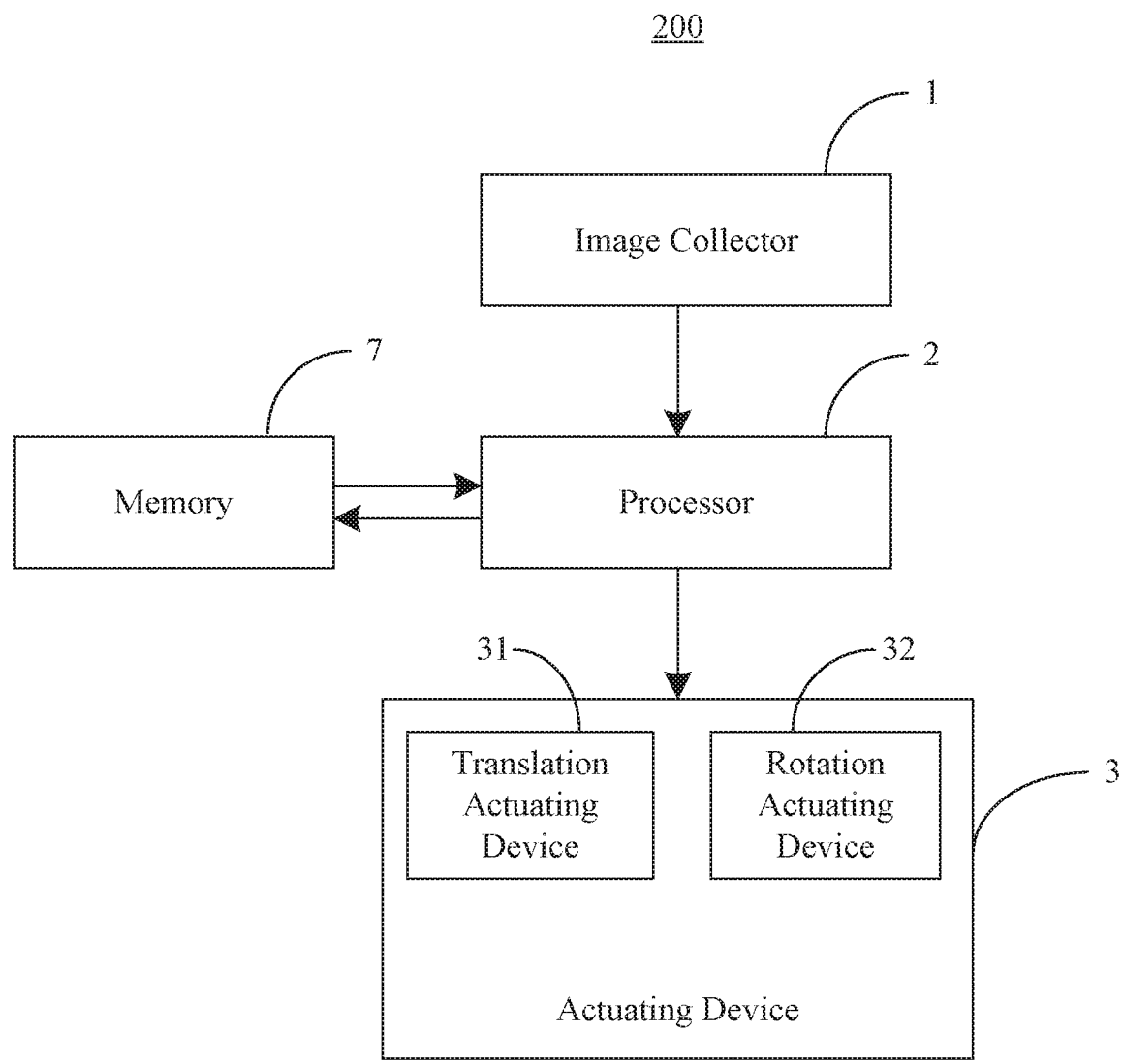
FIG. 1 is a schematic view of an automatically adjustable back view mirror apparatus for a vehicle according to an embodiment of the present disclosure.

In order to make the technical solutions and advantageous of the embodiments of the present disclosure more clearly, the present disclosure will be further described below with reference to the accompanying drawings and exemplified embodiments. Same or similar components in figures are represented by same reference numerals. The skilled person in the art would appreciate that the following description is intended to explain the present disclosure, instead of limiting the present disclosure. It is not intended to limit the protection scope of the present disclosure.

Various sectional views of embodiments of the present disclosure are shown in figures. These figures are not scaled. For the sake of clarity, some details have been enlarged and some details may be omitted. Shapes of various areas, layers and relative sizes and positional relationships of them shown in figures are only exemplified. In practice, deviations may occur due to tolerances or limitation in technology, and the skilled person in the art can otherwise design areas/layers having different shapes, sizes and relative positions.

A back view mirror may typically be fixed at an intermediate position of a vehicle body, or it may be offset towards line of sight of the vehicle driver. The vehicle driver may manually rotate the back view mirror about an axis in a widthwise direction of the vehicle body, to adapt requirements for line of sight of the vehicle driver.

However, as automobile vehicles may have different types, general structures of the back view mirrors cannot satisfy requirements of assembling different types of vehicles. And vehicle drivers may have different driving customs, thus, the fixedly mounted back view mirror that can be adjusted only in one rotation direction can greatly limit applicability of the back view minor. The customary back view mirror lacks automatic control systems such that efficiency of interaction between the vehicle driver and the back view mirror becomes low, and thus field of view of the back view mirror will be limited when the vehicle driver adjusts the back view mirror hurriedly, or the field of view of the back view mirror may not be updated timely when the vehicle driver cannot manually adjust the back view mirror conveniently to cause accidents.

In an embodiment of the present disclosure, it provides a back view mirror device 100 for a vehicle. The back view mirror device 100 includes: a back view mirror body 10; and an actuating device 3. The actuating device 3 may include a translation actuating device 31 and a rotating actuating device 32 (see FIG. 3). The translation actuating device 31 is configured to drive the back view mirror body 10 to translate and position the back view mirror body 10 in a translating direction (in the example shown in FIG. 3, there are two translating directions, i.e., x direction and y direction). The rotating actuating device 32 is configured to drive the back view mirror body 10 to rotate and position the back view mirror body 10 in a rotating direction (in the example shown in FIG. 3, there are two rotating directions, i.e., the rotating direction about z direction and the rotating direction about x direction).

In the customary back view mirror, the manually adjustable back view mirror may typically be rotated, but cannot translate because structures such as guide grooves cannot achieve both reciprocated translation and positioning in real-time. Thus, adjustment of the customary back view mirror is very limited and the efficiency of interaction of the vehicle driver becomes low. The back view mirror device for the vehicle according to an embodiment of the present disclosure can drive the back view mirror body to translate in at least one direction. In comparison with the back view mirror in the related art that can only be rotated by universal shaft, the adjustment of the back view mirror is improved such that the back view mirror can be used widely.

In order to improve the adjustment of the back view mirror, the back view mirror device needs to have a function of translating the back view mirror body. Thus, in an embodiment of the present disclosure, the back view mirror device 100 for the vehicle includes the translation actuating device 31 for driving the back view mirror body to translate and position and the rotation actuating device 32 for driving the back view mirror body to rotate and position. By means of the translation actuating device 31 and the rotation actuating device 32, the back view mirror body 10 can not only translate and rotate accurately, but also be positioned at a suitable position in real-time.

Figure 2:
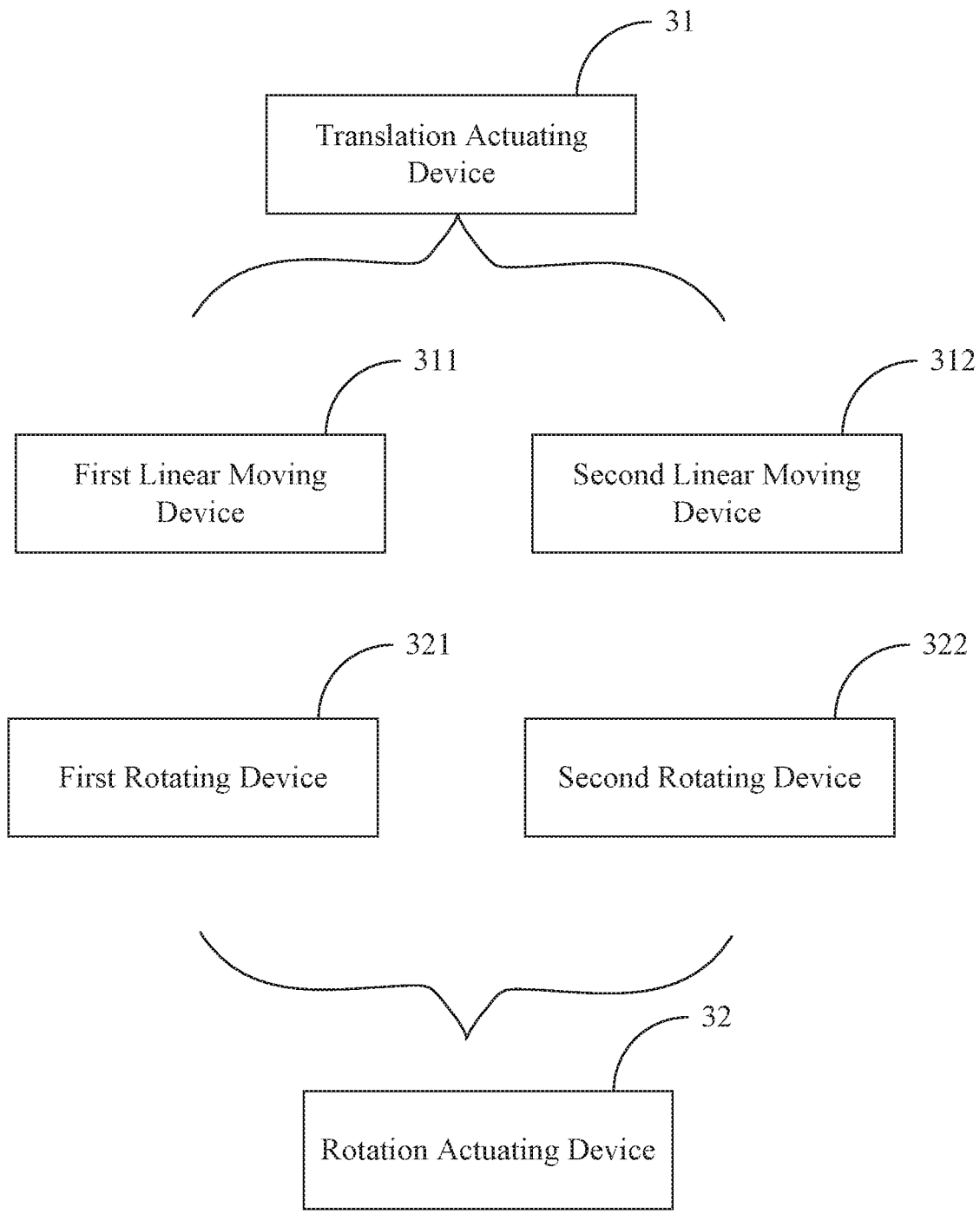
FIG. 2 is a schematic view showing exemplified structures of a translation actuating device and a rotation actuating device in a back view mirror device for a vehicle according to an embodiment of the present disclosure.

As an example, the back view mirror body may have a plurality of translating directions, for example, when the back view mirror body has two translating directions, as shown in FIG. 2, the translation actuating device 31 includes a first linear moving device 311 and a second linear moving device 312. The first linear moving device 311 is configured to drive the back view mirror body 10 to translate in a first direction (for example, x direction in FIG. 3). The second linear moving device 312 is configured to drive the back view mirror body to translate in a second direction (for example, y direction in FIG. 3) perpendicular to the first direction.

As an example, when the back view mirror body is arranged on an inner side of a windshield of the vehicle, the first direction may be a direction parallel to the windshield on which the back view mirror body is arranged and the second direction may be a direction perpendicular to the windshield.

In the back view mirror device, the back view mirror body 10 may typically be rotated about an axis to adapt line of sight of the vehicle driver. As an example, the back view mirror body 10 may have a plurality of rotating directions, for example, when the back view mirror body 10 has two rotating directions, referring to FIG. 2 again, the rotation actuating device 32 includes a first rotating device 321 and a second rotating device 322. The first rotating device 321 is configured to drive the back view mirror body 10 to rotate about a first axis (in the example shown in FIG. 3, the first axis extends along z direction) perpendicular to the first direction and the second direction. The second rotating device 322 is configured to drive the back view mirror body 10 to rotate about a second axis parallel to the first direction.

As an example, when the back view mirror body is arranged on the inner side of the windshield of the vehicle, the first axis may be a vertical axis parallel to the windshield on which the back view mirror body is arranged and the second axis may be a horizontal axis parallel to or perpendicular to the windshield of the vehicle.

Figure 3:
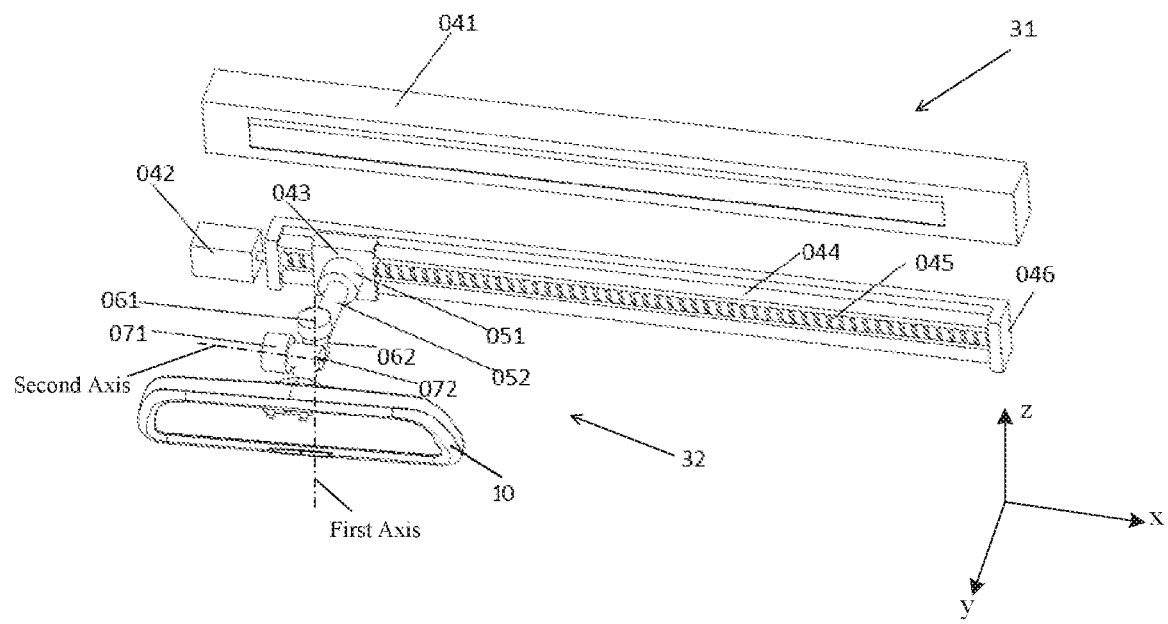
FIG. 3 is a schematic view showing a structure of a back view mirror device for a vehicle according to an embodiment of the present disclosure.

FIG. 3 shows a schematic view showing an exemplified structure of the back view mirror device for the vehicle. The exemplified structure of the back view mirror device will be explained in details below with reference to FIG. 3.

As an example, the translation actuating device 31 includes: a housing 041 (for example, it may be fixed on the windshield of the vehicle); a base 046 and a first driver 042 accommodated in the housing 041; a lead screw 045 connected to the first driver 042 through an end of the base 046; a first guide track 044 connected between two ends of the base 046; a slider connector 043, the first driver 042 driving the lead screw 045 to rotate to move the slider connector 043 on the first guide track 044 in the first direction; a second driver 051 on the slider connector 043; and a second guide track 052 connected onto the second driver 051, the second driver 051 driving the second guide track 052 to move in the second direction perpendicular to the first direction. As an example, the rotation actuating device 32 includes: a first rotation axle connector 062 connected to an end of the second guide track 052; a third driver 061 connected to the first rotation axle connector 062, the first rotation axle connector 062 rotating about the first axis with driven by the third driver 061; a second rotation axle connector 072 connected pivotably to the first rotation axle connector 062; and a fourth driver 071 connected to the second rotation axle connector 072, the second rotation axle connector 072 rotating about the second axis with driven by the fourth driver 071. The back view mirror body 10 is mounted on the second rotation axle connector 072.

For example, one of the first axis and the second axis is perpendicular to both the first direction and the second direction, and the other of the first axis and the second axis is parallel to the first direction. As discussed above, the first direction may be a direction parallel to the windshield on which the back view mirror body is arranged and the second direction may be a direction perpendicular to the windshield, and the first axis may be a vertical axis parallel to the windshield on which the back view mirror body is arranged and the second axis may be a horizontal axis parallel to or perpendicular to the windshield of the vehicle.

As an example, the first driver 041 and the second driver 052 each may include one of an electric cylinder, a gas cylinder or a hydraulic cylinder.

As an example, the third driver 061 and the fourth driver 071 each may include one of a rotation motor, a hydraulic rotation driver or a pneumatic rotation driver.

In the above embodiment of the present disclosure, the back view mirror body 10 has freedom of motion including translation freedom and rotation freedom, such that the back view mirror can at least translate in one or more directions. It provides a translatable back view mirror system. Further, a practical technical solution is shown by specific structures of embodiments. In the embodiment, the first linear moving device 311, the second linear moving device 312, the first rotating device 321 and the second rotating device 322 cooperate with each other such that the back view mirror can translate in two directions and can rotate about each of two axes, so as to increase adjusting range. By means of the combination of the drivers and the lead screw, the first linear moving device not only can translate back and forth, but also can be held at a special position. In contrast to the related art, the back view mirror can be adjusted by translating it.

As seen in FIG. 1, an embodiment of the present disclosure also provides an automatically adjustable back view mirror apparatus 200 for a vehicle. The automatically adjustable back view mirror apparatus 200 includes: the back view mirror device 100 as described in any one of the above embodiments, an image collector 1 and a processor 2. The image collector 1 is configured to collect face image information of a vehicle driver. The processor 2 is configured to determine translation adjustment amounts and rotation adjustment amounts of the back view mirror body based on the image information and to produce a first adjusting signal with the translation adjustment amounts and a second adjusting signal with the rotation adjustment amounts. The translation actuating device 31 is configured to translate the back view mirror body 10 by the translation adjustment amounts in response to the first adjusting signal and the rotation actuating device 32 is configured to rotate the back view mirror body 10 by the rotation adjustment amounts in response to the second adjusting signal. As an example, the first adjusting signal and the second adjusting signal may contain control instructions. They not only may contain the control instructions on moving the back view mirror body 10 or not, but also may contain the control instructions on adjustment amounts (translation vector or rotation vector), for example, in some embodiments, a threshold is provided in the processor such as CPU, MCU. When it is determined that the moving amount of the back view mirror body is less than the threshold, i.e., the back view mirror body does not need to be adjusted, the control instructions outputted by the processor is "no execute"; in contrast, when it is determined that the moving amount of the back view mirror body is greater than the threshold, the processor will output a control instruction containing the adjustment amount through calculation, for example, to translate the back view mirror body by n units towards a certain direction, or to rotate by m degrees towards another direction. The details will be omitted here. In addition, in order to save intermediate execution instructions and information stored in advance or the like, the back view mirror device 200 may further include a memory 7.

Regarding the specific solution of the processor 2 determining the translation adjustment amounts and the rotation adjustment amounts of the back view mirror body on the basis of the image information, it may be achieved by any conventional image recognition methods. For example, it may take a plurality of images in advance corresponding to states that face of the vehicle driver is located in different positions (including translation positions and rotation positions) respectively, and these images may be stored in advance in the memory as reference images. And all of positions of the back view mirror body corresponding to all of the images respectively are also stored in the memory. In operation, when the image collector 1 sends the collected image information to the processor 2, the processor 2 compares the collected image information with each of the reference images stored in the memory one by one, so as to determine which one of the reference images is same or the most similar to the collected image and the position of the back view mirror body corresponding to the one of the reference images same or the most similar to the collected image can be determined as a desired position of the back view mirror body. Then, from the relation between the current position and desired position of the back view mirror body, it can determine the translation adjustment amounts and the rotation adjustment amounts of the back view mirror body. For example, if the back view mirror body needs to translate by 20 mm in the x direction and to translate by 10 mm in the y direction and to rotate by 15 degrees about the first axis so as to move from the current position to the desired position, then these numeral values can be regarded as the translation adjustment amounts and the rotation adjustment amounts of the back view mirror body respectively. The current position of the back view mirror body may for example be obtained from a position feedback device or a coordinate position system in the back view mirror device 100, or images of the back view mirror body 10 taken by the image collector 1. Embodiments of the present disclosure are not limited to using the above means to determine the translation adjustment amounts and the rotation adjustment amounts of the back view mirror body on the basis of the image information. Other image recognition methods in the art, such as deep learning, also can be used to determine the translation adjustment amounts and the rotation adjustment amounts of the back view mirror body on the basis of the image information.

The back view mirror apparatus provided by the present disclosure can drive the back view mirror to translate or rotate in at least one direction. In comparison with the customary back view mirror adjusted in single direction, it can increase flexibility of adjusting the back view mirror. The apparatus can adjust the back view mirror body depending on the position of the back view mirror body and the position of face of the vehicle driver such that the efficiency of the interaction between the vehicle driver and the back view mirror can increase. For example, when the face image of the vehicle driver shows the vehicle driver turns his face towards a certain direction, the processor 2 may control the back view mirror body to move correspondingly to hold eyes of the vehicle driver in field of view of the back view mirror. The movement of the back view mirror body can be achieved by determining suitable translation adjustment amounts and the rotation adjustment amounts.

As an example, the translation adjustment amounts may include a first translation adjustment amount and a second translation adjustment amount. When the translation actuating device 31 includes a first linear moving device 311 and a second linear moving device 312, the first linear moving device 311 is configured to drive the back view mirror body 10 to translate in a first direction by the first translation adjustment amount in response to the first adjusting signal and the second linear moving device 312 is configured to drive the back view mirror body 10 to translate in a second direction perpendicular to the first direction by the second translation adjustment amount in response to the first adjusting signal. In this way, the translation actuating device 31 can adjust the position of the back view mirror body 10 by translating it in at least two directions at the same time on the basis of the face image information of the vehicle driver.

As an example, the rotation adjustment amounts may include a first rotation adjustment amount and a second rotation adjustment amount. When the rotation actuating device 32 includes a first rotating device 321 and a second rotating device 322, the first rotating device 321 is configured to drive the back view mirror body 10 to rotate about a first axis perpendicular to both the first direction and the second direction by the first rotation adjustment amount in response to the second adjusting signal and the second rotating device 322 is configured to drive the back view mirror body 10 to rotate about a second axis parallel to the first direction by the second rotation adjustment amount in response to the second adjusting signal. In this way, the rotation actuating device 32 can adjust the position of the back view mirror body 10 by rotating it in at least two directions at the same time on the basis of the face image information of the vehicle driver.

From the embodiments of the present disclosure, the back view mirror device in the automatically adjustable back view mirror apparatus 200 for the vehicle should include any possible combinations of features disclosed in the above embodiments. In particular, the hardware structure in the embodiments may correspond to any one of the above embodiments. For example, in an embodiment, as seen in FIG. 2, the translation actuating device 31 includes: the first linear moving device 311 configured to drive the back view mirror body 10 to translate in a direction parallel to the windshield of vehicle on which the back view mirror body 10 is arranged in response to the control instructions received from the processor 2; and the second linear moving device 312 configured to drive the back view mirror body 10 to translate in a direction perpendicular to the windshield of vehicle on which the back view mirror body 10 is arranged in response to the control instructions received from the processor 2.

In addition, in the related art, the back view mirror is typically rotated by a universal shaft. However, when the back view mirror needs to be adjusted automatically, i.e., in the automatically adjustable apparatus provided by the present disclosure, the universal shaft will have too complex adjusting forms to provide the most reasonable adjustment timely and to calculate out the adjustment amounts. Thus, the universal shaft may be used in the customary back view mirror, but cannot be used to control and adjust the back view mirror automatically. In the embodiments, the back view mirror body is adjusted by rotation shafts. In this way, the adjustment amounts can be recorded in real-time, for example, can be calculated from rotation amounts of the driver.

Figure 4:
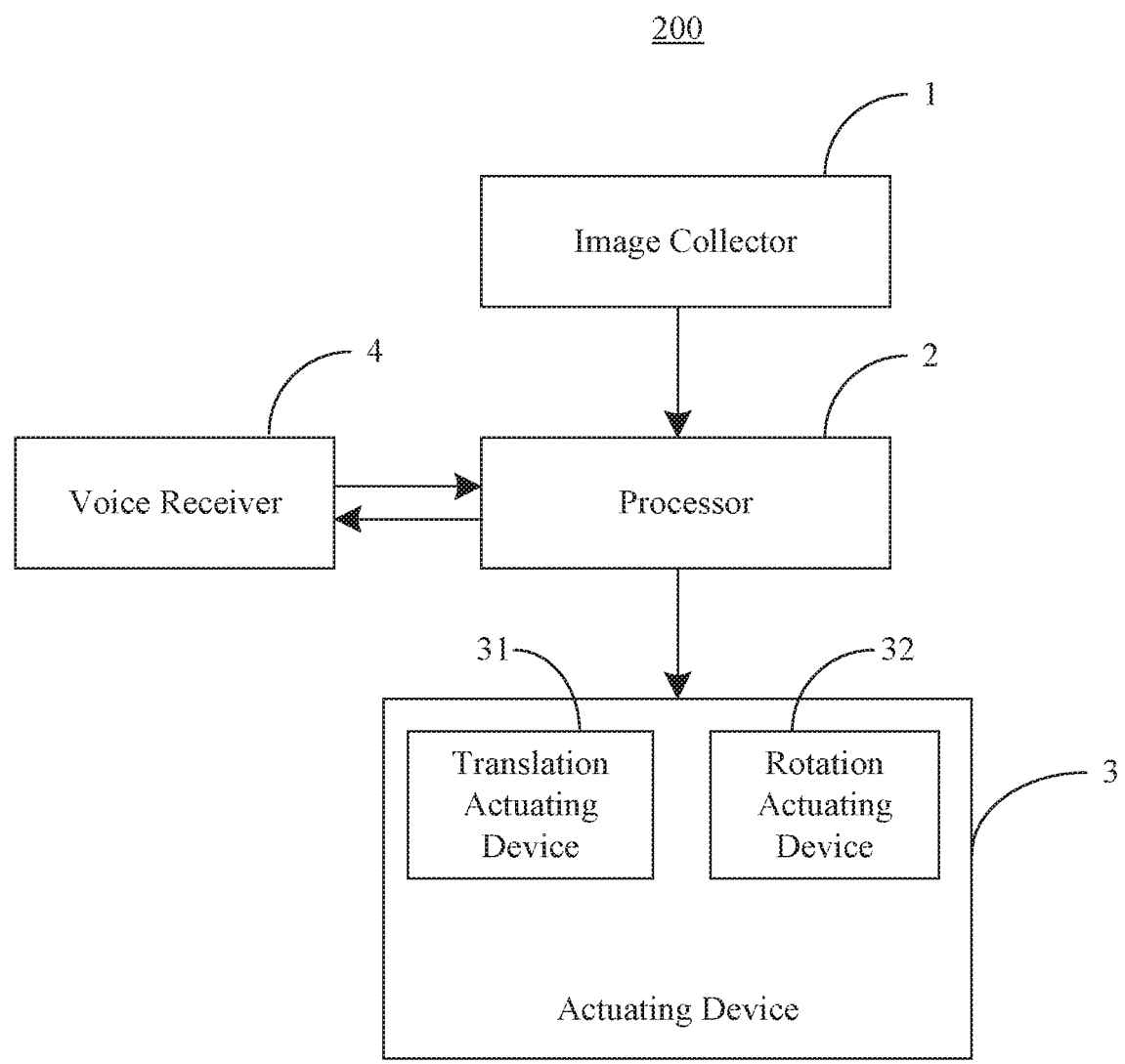
FIG. 4 is a schematic view of another automatically adjustable back view mirror apparatus for a vehicle according to another embodiment of the present disclosure.

When an automobile vehicle stops for a long time or in other scenes that the back view mirror does not need to be adjusted again, if the back view mirror adjusting system turns on all along, the burden of power supply of the vehicle will be increased. Thus, an embodiment of the present disclosure also provides another automatically adjustable back view mirror apparatus for the vehicle. As shown in FIG. 4, the automatically adjustable back view mirror apparatus 300 may further include: a voice receiver 4 configured to receive voice instructions from the vehicle driver and to send the voice instructions to the processor 2. The processor 2 may also be configured to regulate the translation adjustment amounts and the rotation adjustment amounts in response to the voice instructions. In this way, the processor 2 not only can determine the translation adjustment amounts and the rotation adjustment amounts of the back view mirror body by recognizing the face image of the vehicle driver, but also can adjust the position of the back view mirror body by interacting with the vehicle driver in voices. For example, when the voice receiver 4 receives the voice instructions such as "translate towards the left", "rotate towards the right" said by the vehicle driver, the processor 2 may provide the corresponding translation adjustment amounts and the rotation adjustment amounts, such as a translation adjustment amount towards the left, a rotation adjustment amount towards the right.

As an example, the processor 2 may also be configured to turn on the image collector 1 in response to the voice instructions, that is, start the apparatus by voice interaction between the vehicle driver and the apparatus. Typically, a predetermined threshold for sound intensity may be provided in the voice receiver 4. When the sound intensity in the vehicle body is greater than the predetermined threshold, the image collector 1 will turn on; otherwise, when the sound intensity in the vehicle body is lower than the predetermined threshold, the image collector 1 will turn off or be in an "idle" state, so as to save power consumption of the vehicle.

The back view mirror apparatus may be combined with known voice recognition technology and voice decoding technology, for example, the voice instructions of the vehicle driver can be recognized or decoded into control instructions by a voice recognizer or a voice decoder, such that the position of the back view mirror in an automatic control system can be adjusted finely, to adapt habits of the vehicle driver and to improve experiences of the vehicle driver.

The voice recognizer or the voice decoder is applicable for the case that after the back view mirror has been adjusted automatically, the vehicle driver does not satisfy the adjustment and need to adjust the back view mirror finely as required for his habits. At that time, the system receives the voice instructions to adjust the back view mirror to the position and inclined angle that the vehicle driver needs, so as to further improve the efficiency of voice interaction. In this way, the vehicle driver can have higher freedom of adjustment. Certainly, it may also be set to perform the voice instructions at first. After the voice instructions have been performed, the back view mirror is further adjusted automatically. As an example, the back view mirror apparatus for the vehicle according to an embodiment of the present disclosure needs to update the image of the back view mirror body and the face image information of the vehicle driver or to determine the position information of the back view mirror, so as to decide whether the back view mirror body needs to be adjusted again. Thus, in an embodiment, optionally, the image collector 1 may feed back the position information of the back view mirror body and the face image information of the vehicle driver to the processor 2 in real-time. From this, the processor 2 decides whether it needs to continue to adjust, i.e., when the image information in real-time is matched with the predetermined value in the processor, the processor will not continue to output the control instructions any longer; otherwise, the processor continues to output new control instructions.

Figure 5:
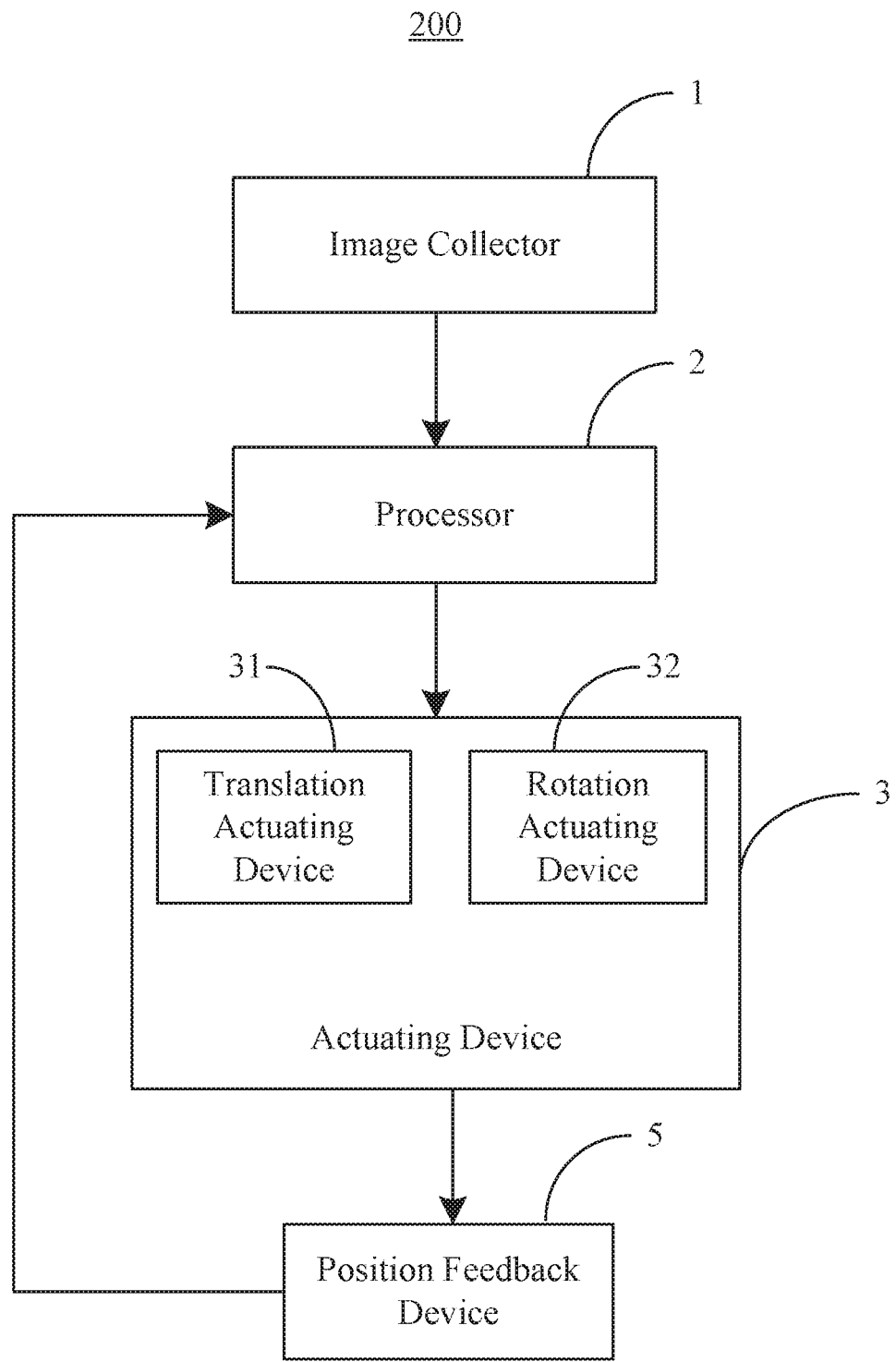
FIG. 5 is a schematic view of a further automatically adjustable back view mirror apparatus for a vehicle according to a further embodiment of the present disclosure.

As an example, referring to FIG. 5, the automatically adjustable back view mirror apparatus 400 may further include a position feedback device 5 which is configured to feed back position of the back view mirror body to the processor in real-time such that the processor determines the position of the back view mirror body in real-time. For example, the position feedback device 5 may be a coder incorporated in the driver.

As an example, the image collector 1 may include a binocular camera. As an example, the face image information of the vehicle driver at least includes eye position image information.

Figure 6:
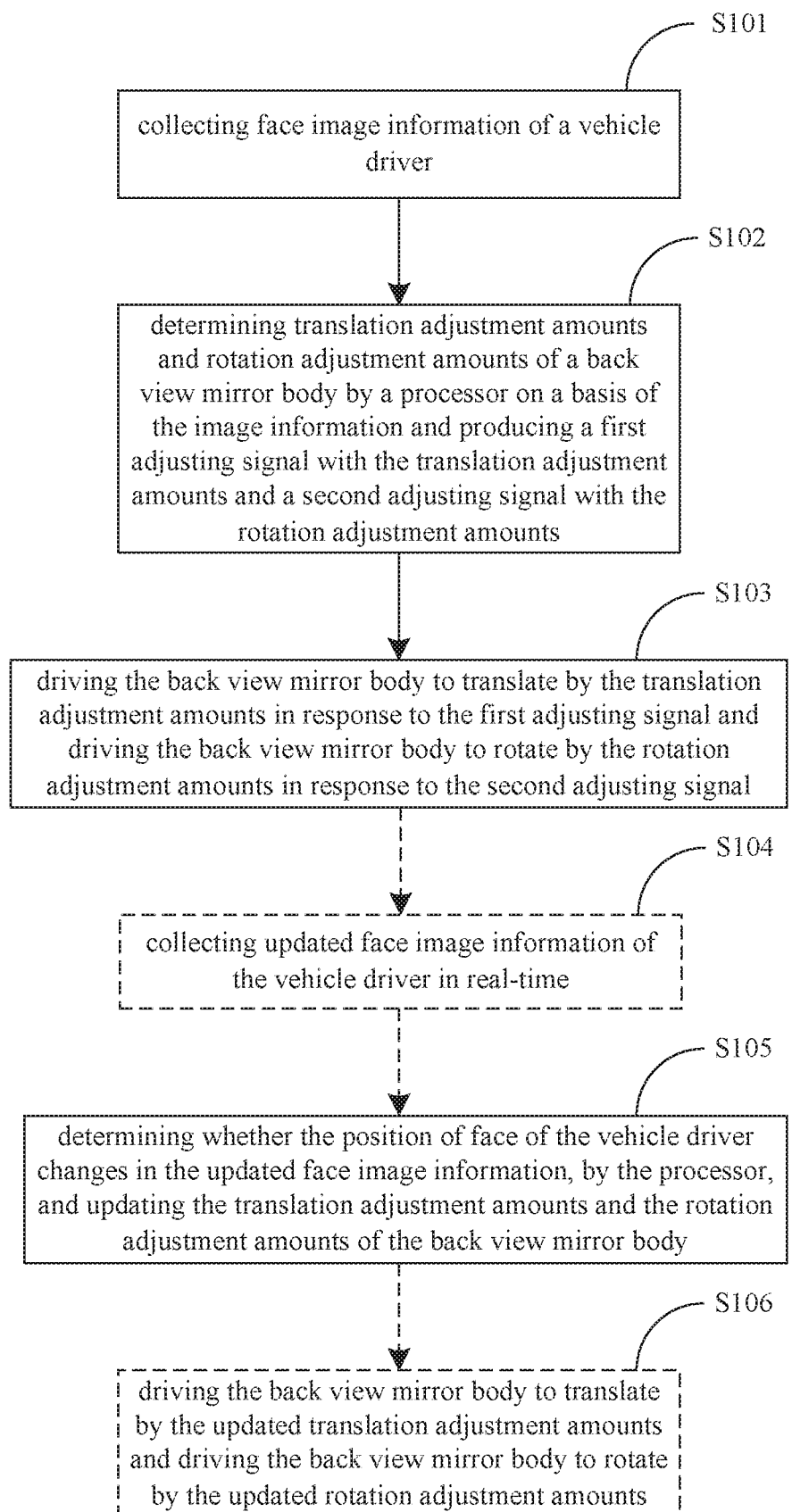
FIG. 6 is a schematic flow chart of a method for automatically adjusting position of back view mirror for a vehicle according to an embodiment of the present disclosure.

An embodiment of the present disclosure provides a method for automatically adjusting a back view mirror. As shown in FIG. 6, the method may include the following steps: S101: collecting face image information of a vehicle driver, for example, collecting eye position image information of face of the vehicle driver using a binocular camera; S102: determining translation adjustment amounts and rotation adjustment amounts of a back view mirror body by a processor on a basis of the image information and producing a first adjusting signal with the translation adjustment amounts and a second adjusting signal with the rotation adjustment amounts; and S103: driving the back view mirror body to translate by the translation adjustment amounts in response to the first adjusting signal and driving the back view mirror body to rotate by the rotation adjustment amounts in response to the second adjusting signal.

In particular, in the step S103, the image collector may collect the current position information of the back view mirror body in real-time and feedback it to the processor in real-time. When the processor decides that the back view mirror body has not reached the determined position, the back view mirror body will be driven continuously to move. When the processor decides that the back view mirror body has reached the determined position, the back view mirror body will not be driven and thus stop.

Further, the processor decides whether the back view mirror body should be driven continuously by means of the image collector collecting the image information in real-time or by means of the position feedback device feeding back the position of the back view mirror in real-time.

Referring to FIG. 6 again (the steps indicated by dashed line block in FIG. 6 are optional), as an example, the method may further include the following steps: S104: collecting updated face image information of the vehicle driver in real-time; S105: determining whether the position of face of the vehicle driver changes in the updated face image information, by the processor, and updating the translation adjustment amounts and the rotation adjustment amounts of the back view mirror body; and S106: driving the back view mirror body to translate by the updated translation adjustment amounts and driving the back view mirror body to rotate by the updated rotation adjustment amounts.

In this way, the position of the back view mirror body 10 can be adjusted in real-time.

Figure 8:
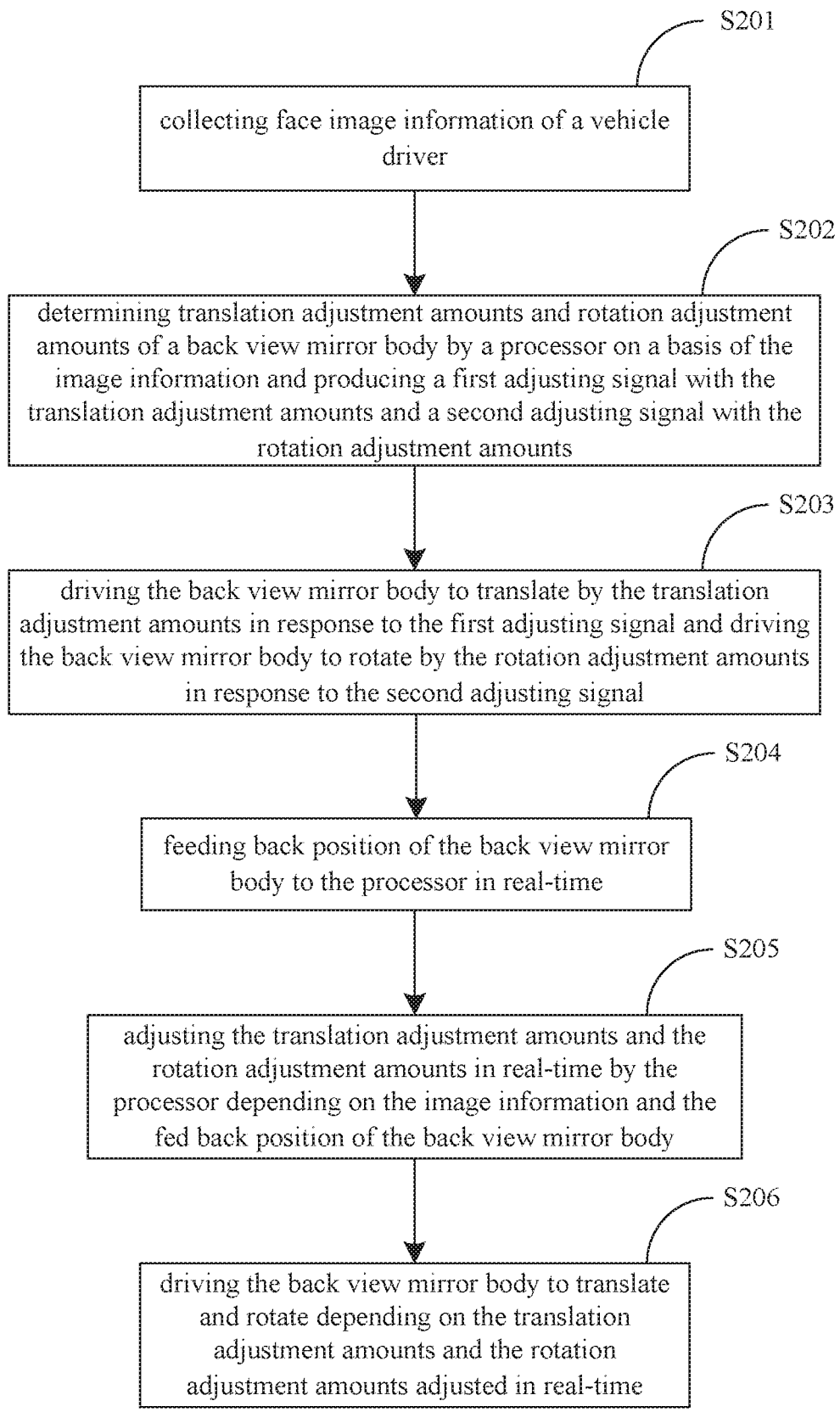
FIG. 8 is a schematic flow chart of another method for automatically adjusting position of back view mirror for a vehicle according to another embodiment of the present disclosure.

As shown in FIG. 8, as an example, when the position feedback device feeds back the position of the back view mirror body in real-time, the method includes the following steps: S201: collecting face image information of a vehicle driver, for example, collecting eye position image information of face of the vehicle driver using a binocular camera; S202: determining translation adjustment amounts and rotation adjustment amounts of a back view mirror body by a processor on a basis of the image information and producing a first adjusting signal with the translation adjustment amounts and a second adjusting signal with the rotation adjustment amounts; S203: driving the back view mirror body to translate by the translation adjustment amounts in response to the first adjusting signal and driving the back view mirror body to rotate by the rotation adjustment amounts in response to the second adjusting signal; S204: feeding back position of the back view mirror body to the processor in real-time; S205: adjusting the translation adjustment amounts and the rotation adjustment amounts in real-time by the processor depending on the image information and the fed back position of the back view mirror body; and S206: driving the back view mirror body to translate and rotate depending on the translation adjustment amounts and the rotation adjustment amounts adjusted in real-time.

In an example, the position feedback device may include a coder.

The above method can achieve control of the position of the back view mirror body in real-time.

Figure 7:
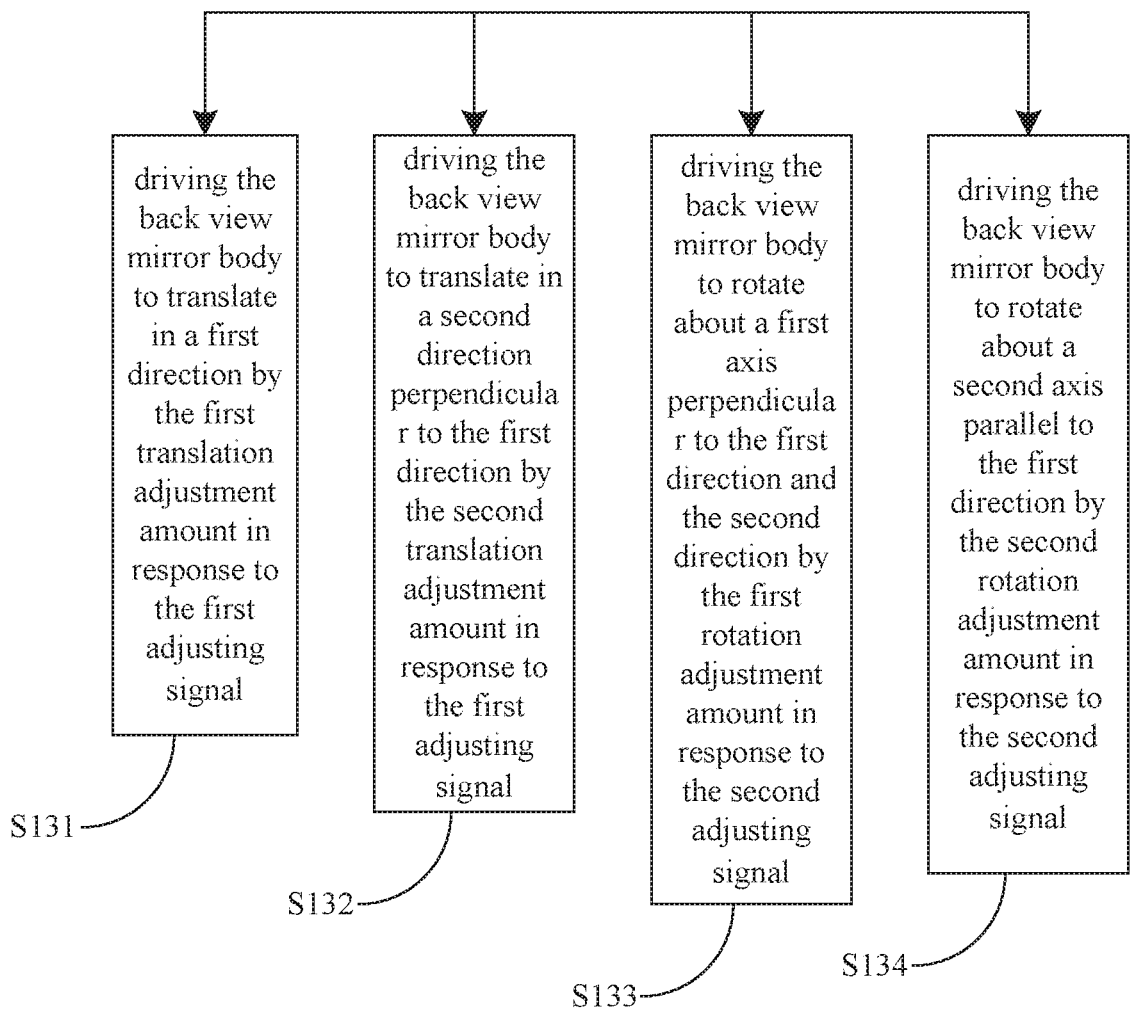
FIG. 7 is a schematic flow chart of the exemplified specific steps of the step S103 shown in FIG. 6.

As an example, the translation adjustment amounts include a first translation adjustment amount and a second translation adjustment amount, and the rotation adjustment amounts include a first rotation adjustment amount and a second rotation adjustment amount. With reference to FIG. 7, the above step S103 further includes at least one of following steps: S131: driving the back view mirror body to translate in a first direction by the first translation adjustment amount in response to the first adjusting signal; S132: driving the back view mirror body to translate in a second direction perpendicular to the first direction by the second translation adjustment amount in response to the first adjusting signal; S133: driving the back view mirror body to rotate about a first axis perpendicular to the first direction and the second direction by the first rotation adjustment amount in response to the second adjusting signal; and S134: driving the back view mirror body to rotate about a second axis parallel to the first direction by the second rotation adjustment amount in response to the second adjusting signal.

That is, the method provided by the present embodiment can automatically drive the back view mirror body 10 to translate or rotate in at least one direction.

Further, the method may further incorporate a voice control method, for example, providing a voice decoder or a void recognizer to decode or recognize voice instructions of the vehicle driver and to input the decoded or recognized voice instructions into the processor, so as to finely adjust the back view mirror body or to adjust the back view mirror body at first. The details will be omitted.

Figure 9:
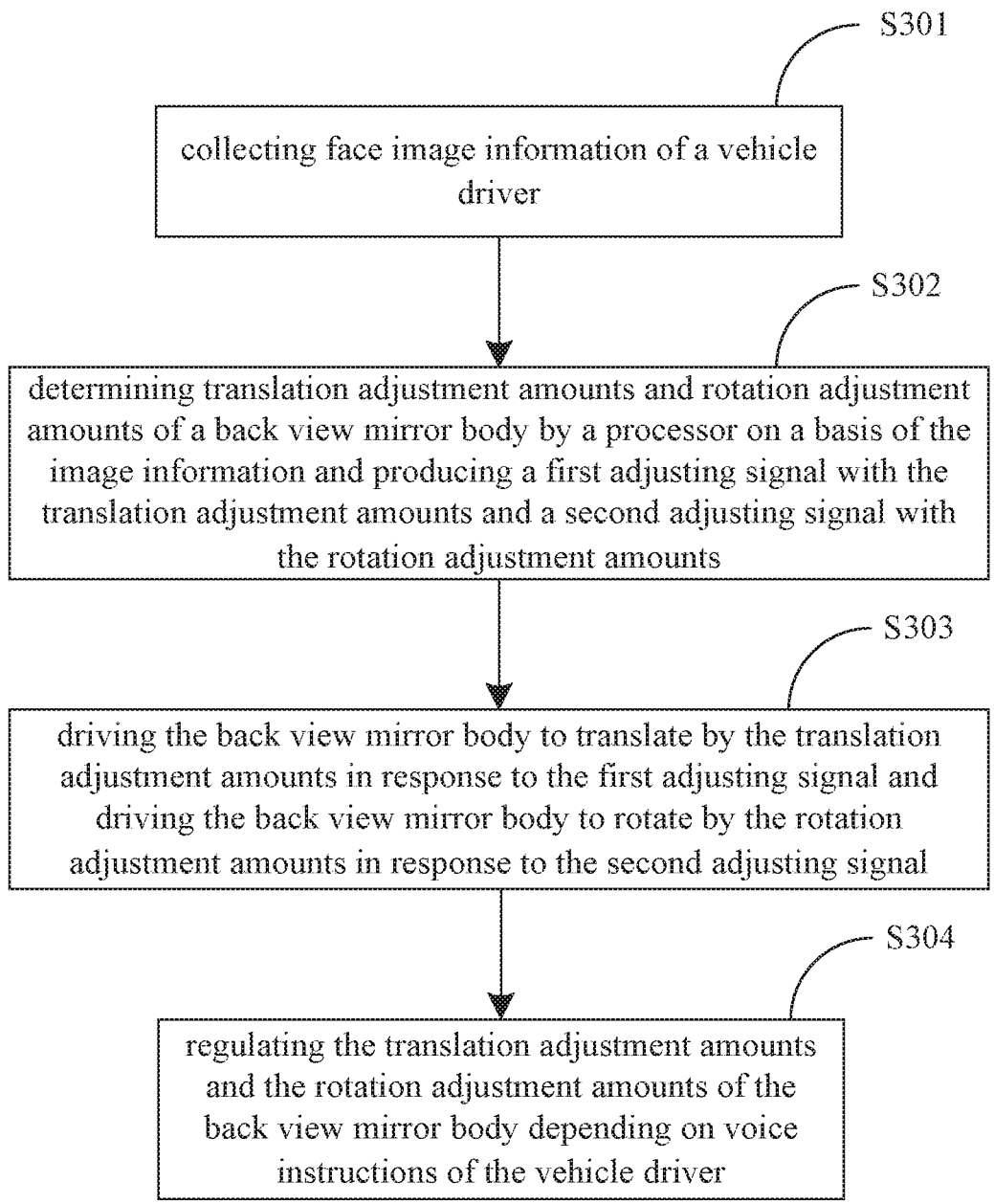
FIG. 9 is a schematic flow chart of a further method for automatically adjusting position of back view mirror for a vehicle according to a further embodiment of the present disclosure.

As an example, as seen in FIG. 9, the method may further include the following steps: S301: collecting face image information of a vehicle driver, for example, collecting eye position image information of face of the vehicle driver using a binocular camera; S302: determining translation adjustment amounts and rotation adjustment amounts of a back view mirror body by a processor on a basis of the image information and producing a first adjusting signal with the translation adjustment amounts and a second adjusting signal with the rotation adjustment amounts; S303: driving the back view mirror body to translate by the translation adjustment amounts in response to the first adjusting signal and driving the back view mirror body to rotate by the rotation adjustment amounts in response to the second adjusting signal; and S304: regulating the translation adjustment amounts and the rotation adjustment amounts of the back view mirror body depending on voice instructions of the vehicle driver.

In this way, the movement of the back view mirror body can be adjusted by voice interaction between the apparatus and the vehicle driver. It provides the vehicle driver flexibility of controlling position of the back view mirror body as required.

In addition, in another embodiment of the present disclosure, a voice control mode may be provided, that is, the method further includes: setting a threshold of sound intensity; and when the intensity of the sound signal in the vehicle body is greater than or equal to the threshold, performing the method; otherwise, when the intensity of the sound signal in the vehicle body is lower than the threshold, preventing the method from being performed to save power consumption of the vehicle.

In the embodiment, an additional starting means based on voice control is provided, thus, when the back view mirror body does not need to be adjusted, the power consumption of the vehicle can be saved.

An embodiment of the present disclosure also provides an intelligent vehicle-mounted system. The system includes: the back view mirror for the vehicle as described in any of the above embodiments; an image collector configured to collect image information associated with face of the vehicle driver; and a processor configured to determine movement state of the back view mirror body on a basis of the image information; wherein an actuating device of the back view mirror device makes the back view mirror body be in the movement state in response to control instructions received by the processor. In particular, the processor and the image collector may be provided on the back view mirror body, or may alternatively be provided on an automobile vehicle, or provided as an internal module on the automobile vehicle. Embodiments of the present disclosure are not limited to them.

An embodiment of the present disclosure also provides a computer readable medium in which computer program instructions are stored. When a processor executes these instructions, it instructs: an image collector to collect face image information of a vehicle driver; the processor to determine translation adjustment amounts and rotation adjustment amounts of the back view mirror body and to produce a first adjusting signal with the translation adjustment amounts and a second adjusting signal with the rotation adjustment amounts; and the translation actuating device to translate the back view mirror body by the translation adjustment amounts and the rotation actuating device to rotate the back view mirror body by the rotation adjustment amounts, so as to perform at least one of the following steps: driving the back view mirror body to translate in a first direction by the first translation adjustment amount; driving the back view mirror body to translate in a second direction perpendicular to the first direction by the second translation adjustment amount; driving the back view mirror body to rotate about a first axis perpendicular to the first direction and the second direction by the first rotation adjustment amount; and driving the back view mirror body to rotate about a second axis parallel to the first direction by the second rotation adjustment amount.

Any combination of one or more computer readable media may be used. The computer readable medium may be a computer readable signal medium or a computer readable storage medium. The computer readable storage medium may for example be, but not limited to, electric, magnetic, optical, electromagnetic, infrared or semiconductor system, device or apparatus, or any combination thereof. The exemplified examples of the computer readable storage medium (in an unrestricted list) include: electrical connection having one or more wires, a portable computer magnetic disk, a hard disk, a random access memory (RAM), a read-only memory (ROM), an electrically programmable read-only memory (EPROM or flash memory), an optical fiber, a compact disc read-only memory (CD-ROM), an optical storage device, a magnetic storage device or any combination thereof. In the present disclosure, the computer readable storage medium may be tangible medium containing or storing programs. The programs may be instructed to be used by execution system, device or apparatus or combined with the execution system, device or apparatus.

The computer readable signal medium may include data signals comprised in baseband or propagated as a part of carrier wave. The data signals carry computer readable program codes. Such data signals propagated may be in various forms, including, but not limited to, electromagnetic signals, optical signals or any combination thereof. The computer readable medium may send, propagate or transmit programs executed by instruction execution system, device or apparatus or combined with instruction execution system, device or apparatus.

The program codes contained in the computer readable medium may be transmitted by any suitable media, including, but not limited to, wireless, wire, optical fiber, RF, and so on, or any suitable combination thereof.

The computer program codes for executing the operations of the present disclosure may be programmed by one or more programming languages or any combination thereof. The programming languages may include object-oriented programming languages, such as Java, Smalltalk, C++, may also include the conventional procedural programming languages such as "C" language or similar programming languages. The program codes may be executed completely on a computer of a user, executed partly on the computer of the user, executed as a separate software package, executed partly on the computer of the user and partly on the remote computer, or executed completely on the remote computer or a server. In the case involved in remote computer, the remote computer may be connected to the computer of the user by any types of networks, including local area network (LAN) or wide area network (WAN), or connected to the external computer (for example by Internet provided by Internet service providers).

The terms of "first", "second", and so on in the description, claims and drawings in the present disclosure are intended to distinct different objects from each other, instead of describing special orders. Further, the terms of "comprise", "include" and "have" and any variants thereof are intended to cover "non-exclusively comprising". For example, a process, a method, a system, a product or an apparatus containing a series of steps or units are not limited to listed steps or units, but alternatively comprise steps or units that are not listed, or alternatively comprise inherent steps or units for the process, method or apparatus.

Apparently, the above embodiments of the present disclosure are only intended to explain the exemplified examples of the present disclosure clearly, instead of limiting the embodiments of the present disclosure. The skilled person in the art would appreciate that other various forms of variants or modification can be made on a basis of the above description. All of embodiments cannot be listed here. Apparent change or modification that the technical solutions of the present disclosure extend will fall within the protection scope of the present disclosure.

What is claimed is:

1. A back view mirror device for a vehicle, the back view mirror device comprising:
   a back view mirror body;
   a translation actuating device configured to drive the back view mirror body to translate and position the back view mirror body in a translating direction; and
   a rotation actuating device configured to drive the back view mirror body to rotate and position the back view mirror body in a rotating direction,
   wherein the translation actuating device comprises:
   a housing;
   a base and a first driver accommodated in the housing;
   a lead screw connected to the first driver through an end of the base;
   a first guide track connected between two ends of the base;
   a slider connector, the first driver driving the lead screw to rotate to move the slider connector on the first guide track in a first direction;
   a second driver on the slider connector; and
   a second guide track connected onto the second driver, the second driver driving the second guide track to move in a second direction perpendicular to the first direction.

2. The back view mirror device according to claim 1, wherein the rotation actuating device comprises:
   a first rotating device configured to drive the back view mirror body to rotate about a first axis perpendicular to the first direction and the second direction; and
   a second rotating device configured to drive the back view mirror body to rotate about a second axis parallel to the first direction.

3. The back view mirror device according to claim 1, wherein the rotation actuating device comprises:
   a first rotation axle connector connected to an end of the second guide track;
   a third driver connected to the first rotation axle connector, the first rotation axle connector rotating about a first axis with driven by the third driver;
   a second rotation axle connector connected pivotably to the first rotation axle connector; and
   a fourth driver connected to the second rotation axle connector, the second rotation axle connector rotating about a second axis with driven by the fourth driver;
   wherein the back view mirror body is mounted on the second rotation axle connector, and
   wherein one of the first axis and the second axis is perpendicular to both the first direction and the second direction, and the other of the first axis and the second axis is parallel to the first direction.

4. The back view mirror device according to claim 1, wherein the first driver and the second driver each comprise one of an electric cylinder, a gas cylinder or a hydraulic cylinder.

5. The back view mirror device according to claim 3, wherein the third driver and the fourth driver each comprise one of a rotation motor, a hydraulic rotation driver or a pneumatic rotation driver.

6. An automatically adjustable back view mirror apparatus for a vehicle, the automatically adjustable back view mirror apparatus comprising:
   the back view mirror device according to claim 1;
   an image collector configured to collect a face image information of a vehicle driver; and
   a processor configured to determine translation adjustment amounts and rotation adjustment amounts of the back view mirror body, on a basis of the face image information, and to produce a first adjusting signal with the translation adjustment amounts and a second adjusting signal with the rotation adjustment amounts,
   wherein the translation actuating device is configured to translate the back view mirror body by the translation adjustment amounts in response to the first adjusting signal and the rotation actuating device is configured to rotate the back view mirror body by the rotation adjustment amounts in response to the second adjusting signal.

7. The automatically adjustable back view mirror apparatus according to claim 6, wherein the translation adjustment amounts comprise a first translation adjustment amount and a second translation adjustment amount, and the translation actuating device comprises:
   a first linear moving device configured to drive the back view mirror body to translate in a first direction by the first translation adjustment amount in response to the first adjusting signal; and
   a second linear moving device configured to drive the back view mirror body to translate in a second direction perpendicular to the first direction by the second translation adjustment amount in response to the first adjusting signal.

8. The automatically adjustable back view mirror apparatus according to claim 6, wherein the rotation adjustment amounts comprise a first rotation adjustment amount and a second rotation adjustment amount, and the rotation actuating device comprises:
   a first rotating device configured to drive the back view mirror body to rotate about a first axis perpendicular to the first direction and the second direction by the first rotation adjustment amount in response to the second adjusting signal; and
   a second rotating device configured to drive the back view mirror body to rotate about a second axis parallel to the first direction by the second rotation adjustment amount in response to the second adjusting signal.

9. The automatically adjustable back view mirror apparatus according to claim 6, wherein the face image information of the vehicle driver at least comprises eye position image information.

10. The automatically adjustable back view mirror apparatus according to claim 6, wherein the image collector comprises a binocular camera.

11. The automatically adjustable back view mirror apparatus according to claim 6, further comprising:
    a voice receiver configured to receive voice instructions from the vehicle driver and to send the voice instructions to the processor,
    wherein the processor is also configured to regulate the translation adjustment amounts and the rotation adjustment amounts in response to the voice instructions.

12. The automatically adjustable back view mirror apparatus according to claim 6, further comprising:
    a position feedback device configured to feed back position of the back view mirror body to the processor in real-time.

13. A method for automatically adjusting position of a back view mirror of claim 1 for a vehicle, the method comprising:
    collecting face image information of a vehicle driver;
    determining translation adjustment amounts and rotation adjustment amounts of a back view mirror body by a processor on a basis of the image information and producing a first adjusting signal with the translation adjustment amounts and a second adjusting signal with the rotation adjustment amounts; and driving the back view mirror body to translate by the translation adjustment amounts in response to the first adjusting signal and driving the back view mirror body to rotate by the rotation adjustment amounts in response to the second adjusting signal.

14. The method according to claim 13, wherein the translation adjustment amounts comprise a first translation adjustment amount and a second translation adjustment amount, and the rotation adjustment amounts comprise a first rotation adjustment amount and a second rotation adjustment amount, and wherein the driving the back view mirror body to translate by the translation adjustment amounts in response to the first adjusting signal and driving the back view mirror body to rotate by the rotation adjustment amounts in response to the second adjusting signal comprises at least one of following steps:

driving the back view mirror body to translate in a first direction by the first translation adjustment amount in response to the first adjusting signal;

driving the back view mirror body to translate in a second direction perpendicular to the first direction by the second translation adjustment amount in response to the first adjusting signal;

driving the back view mirror body to rotate about a first axis perpendicular to the first direction and the second direction by the first rotation adjustment amount in response to the second adjusting signal; and driving the back view mirror body to rotate about a second axis parallel to the first direction by the second rotation adjustment amount in response to the second adjusting signal.

15. The method according to claim 13, wherein the determining translation adjustment amounts and rotation adjustment amounts of a back view mirror body by a processor on a basis of the image information comprises:

feeding back position of the back view mirror body to the processor in real-time and determining the translation adjustment amounts and the rotation adjustment amounts by the processor depending on the image information and the fed back position of the back view mirror body.

16. The method according to claim 13, further comprising:

collecting updated face image information of the vehicle driver in real-time;

determining whether the position of face of the vehicle driver changes in the updated face image information, by the processor, and updating the translation adjustment amounts and the rotation adjustment amounts of the back view mirror body; and driving the back view mirror body to translate by the updated translation adjustment amounts and driving the back view mirror body to rotate by the updated rotation adjustment amounts.

17. The method according to claim 13, wherein the face image information of the vehicle driver at least comprises eye position image information.

18. The method according to claim 13, further comprising:

regulating the translation adjustment amounts and the rotation adjustment amounts of the back view mirror body depending on voice instructions of the vehicle driver.

* * * * *